INVENTOR.
ROY W. JOHNSON
WILLIAM A. BIERMANN
STANLEY E. BURGHDUFF

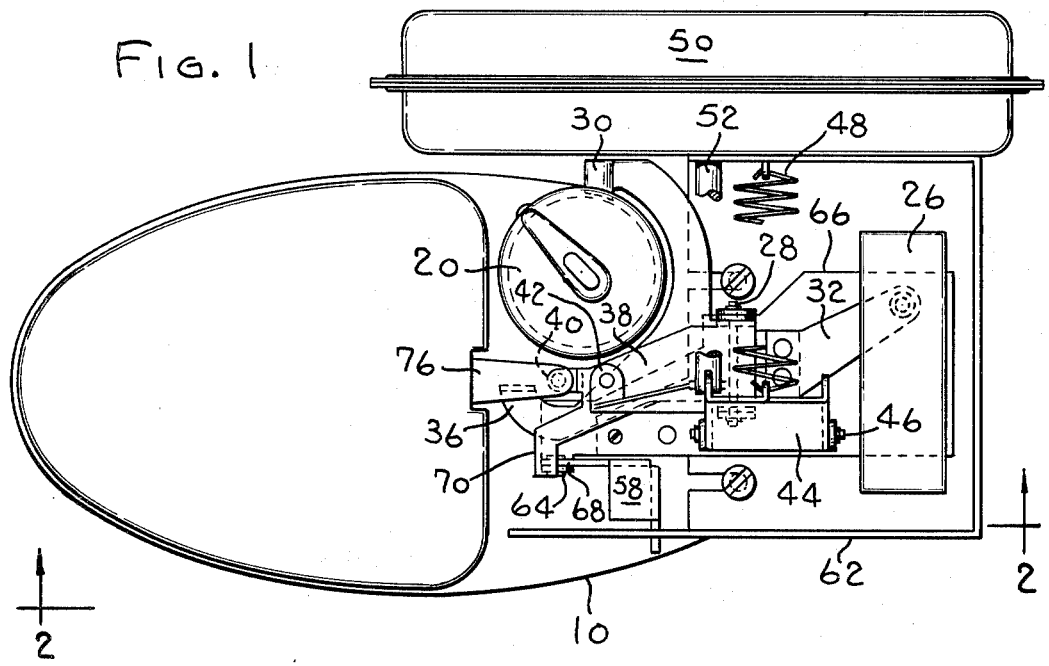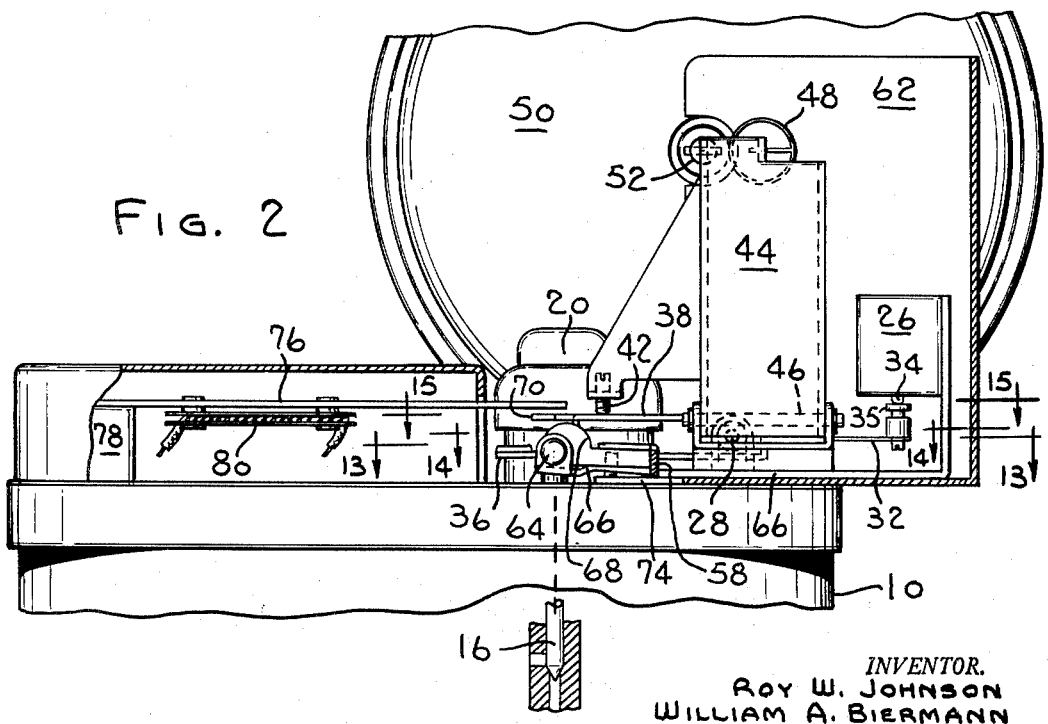

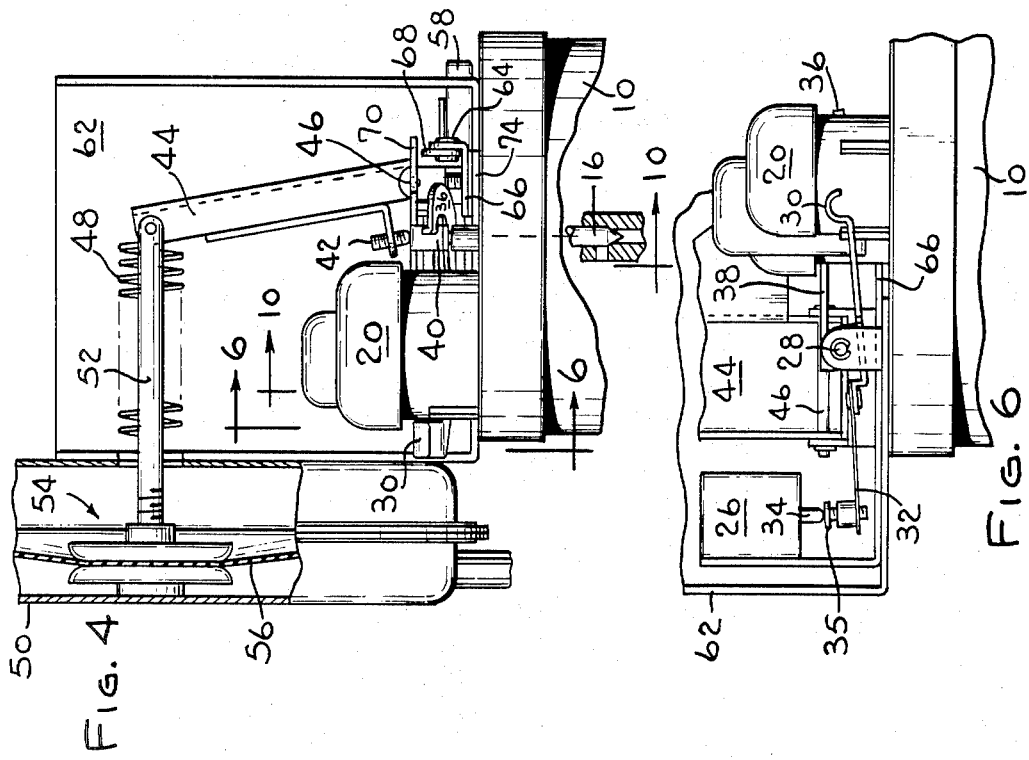
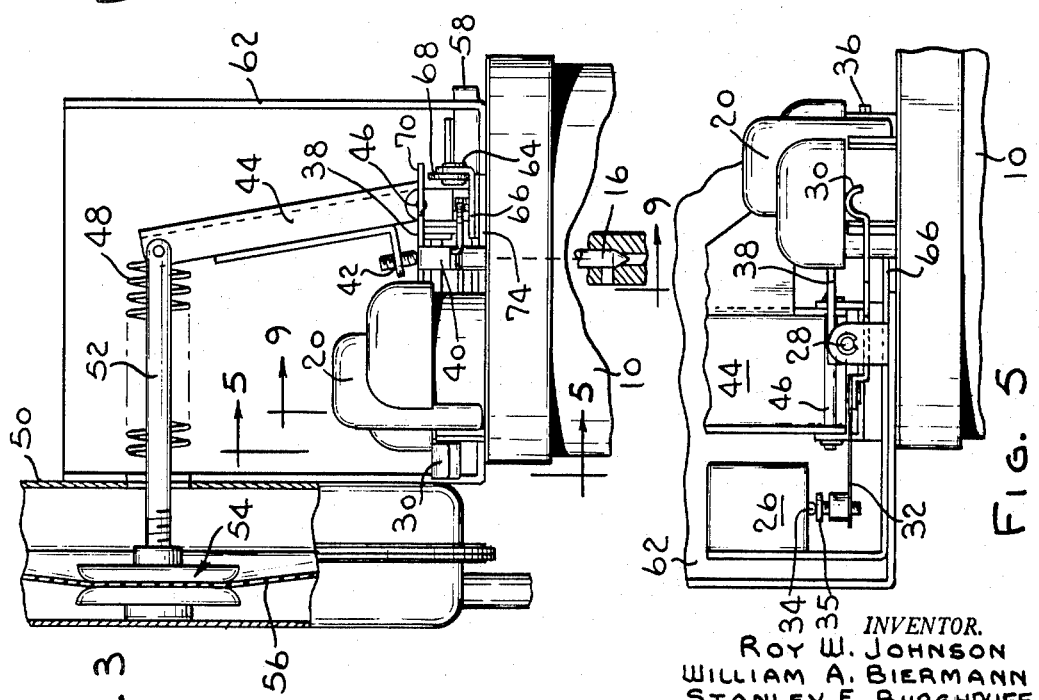

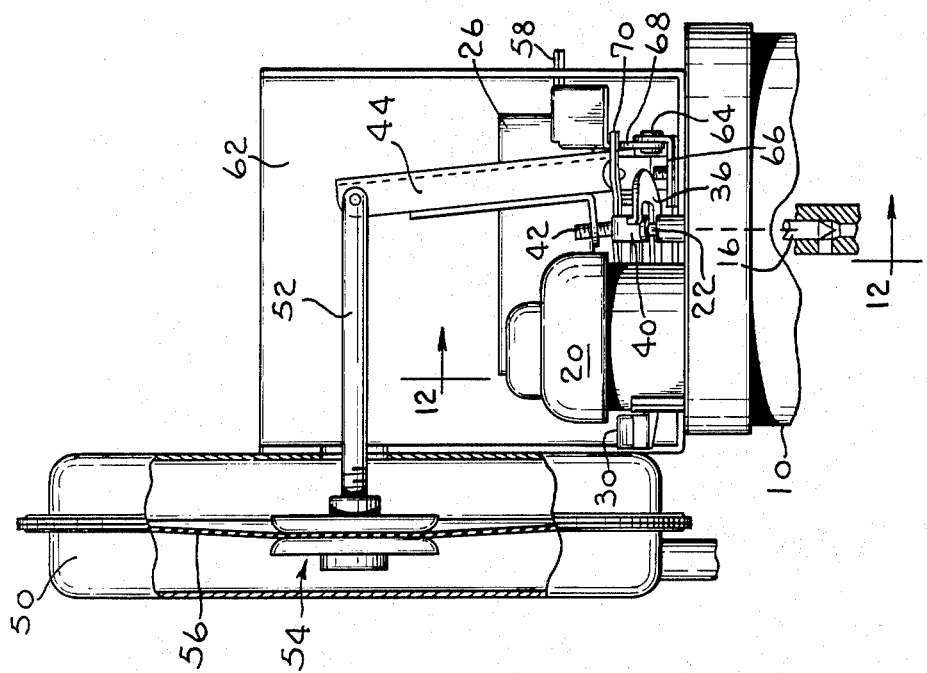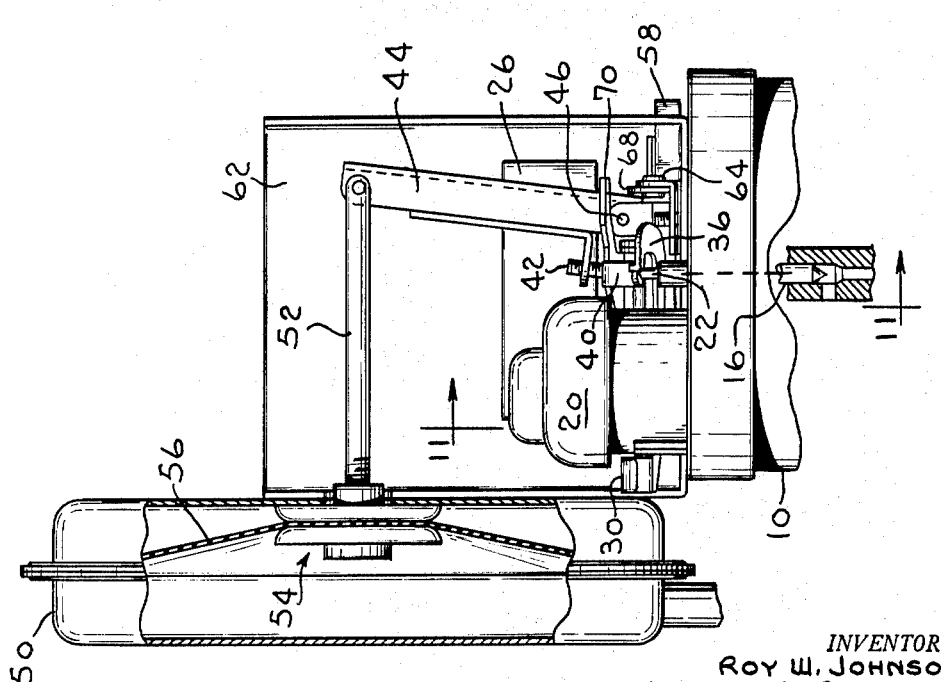

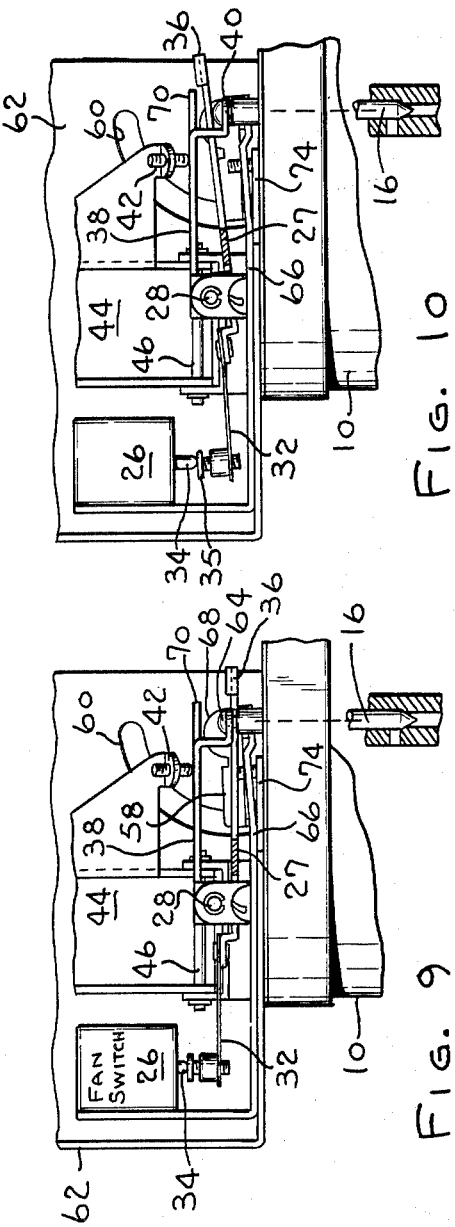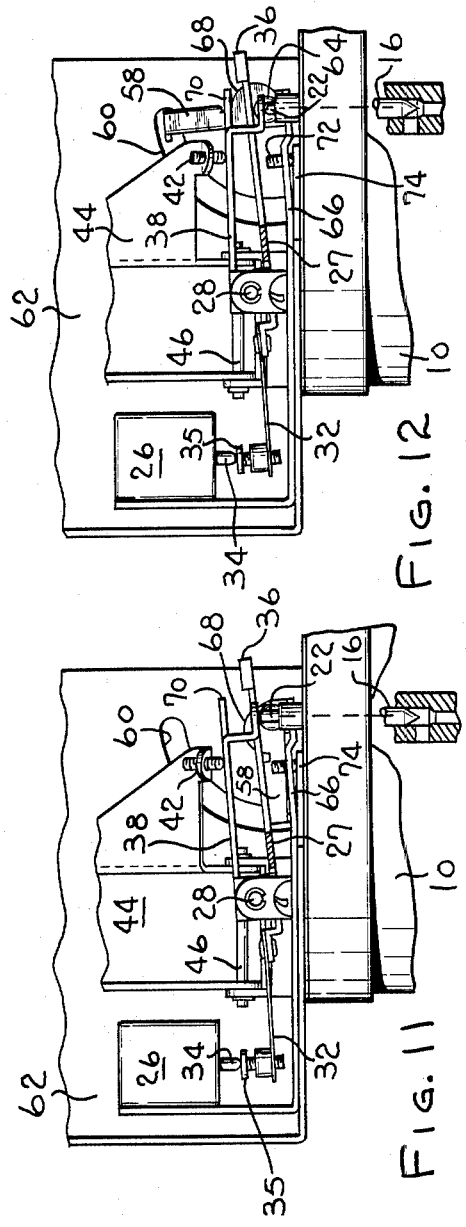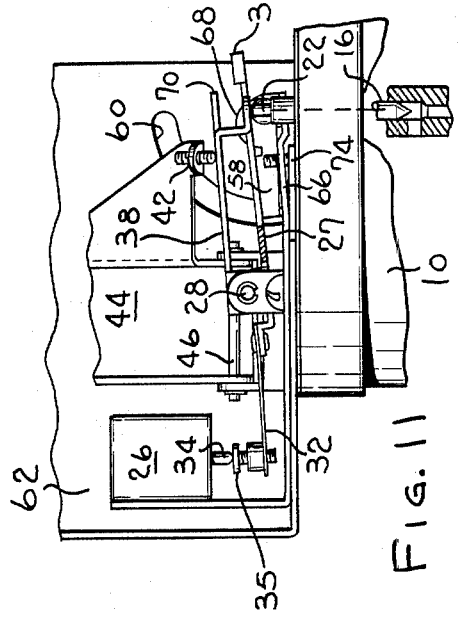

BY John W. Michael
ATTORNEY

United States Patent Office 2,743,769
Patented May 1, 1956

2,743,769

FUEL AND AIR SUPPLY CONTROL FOR BURNERS

Roy W. Johnson, William A. Biermann, and Stanley E. Burghduff, Milwaukee, Wis., assignors to A-P Controls Corporation, Milwaukee, Wis., a corporation of Wisconsin Application June 14, 1954, Serial No. 436,486

7 Claims. (Cl. 158—28)

This invention relates to a control for preventing oil flow to a fuel burner until the fan supplying combustion air to the burner has started. More accurately stated, the present control allows low fuel flow rates (for pilot flow) when the fan is not operating and prevents an increase in the rate beyond that which is safe and relatively smokeless until the fan operates.

The principal object of this invention is to provide a control insuring proper supply of fuel and combustion air to a burner requiring forced air supply.

Another object is to provide a control of the type described in which the fuel flow may be manually increased to a maximum safe flow rate during a power failure period and in which the manual control is returned to an inoperative position upon restoration of the power supply.

Other objects and advantages will be pointed out in, or be apparent from, the specifications and claims, as will obvious modifications of the single embodiment shown in the drawings in which:

Fig. 1 is a top plan view of a constant level valve provided with the present control and with an electrically controlled valve operator which adapts the valve to thermostatic control;

Fig. 2 is an elevation with parts broken away viewed as indicated by line 2—2 in Fig. 1;

Fig. 3 is an end elevation of the assembly as viewed from the left in Fig. 1 with the electric valve operator and the cover plate enclosing the present control removed to expose the linkage in the position occupied when the fan is not operating and the valve control knob is set to pilot position;

Fig. 4 is similar to Fig. 3 and shows the parts in substantially the same position as in Fig. 3, but the knob turned to permit the valve to open to the full flow position;

Fig. 5 is a view taken as indicated by line 5—5 on Fig. 3 to show the position of the various levers;

Fig. 6 is a view similar to Fig. 5 and is taken as indicated by line 6—6 on Fig. 4;

Fig. 7 is a view similar to Fig. 4, but shows the position of the various control levers after the fan has started;

Fig. 8 is a view similar to Figs. 4 and 7, but shows the position of the diaphragm and associated linkage when the manual override control is placed into operation during a power failure period;

Fig. 9 is a section taken as indicated by line 9—9 on Fig. 3;

Fig. 10 is a section taken as indicated by line 10—10 on Fig. 4;

Fig. 11 is a section taken as indicated by line 11—11 on Fig. 7;

Fig. 12 is a section taken as indicated by line 12—12 on Fig. 8;

The present control is adapted for use in connection with a constant level valve of the type in which the output flow rate to the burner is determined by the setting of the manually adjustable knob. The constant level valve is also provided with an actuating pin which projects above the valve housing and may be actuated to close the outlet valve independently of the setting of the manual knob. Thus, the outlet valve may be opened to a high fire flow rate by adjusting the manual knob. However, if an additional control acts on the actuating pin, the outlet valve will not open until the control acting on the pin moves off the pin to allow the outlet valve to open to a maximum position determined by the manual knob setting. The present control is adapted to operate on the actuating pin and holds the actuating pin in the position preventing opening of the outlet valve beyond a predetermined limit until actuated by a diaphragm positioned to respond to delivery of air pressure occasioned by operation of a fan. When the control senses the air pressure, it lifts off the actuating pin to allow the outlet valve to open to the maximum flow rate determined by the setting of the manual knob.

The present control operates equally well with the outlet valve operation controlled manually or thermostatically and may be provided with a switch for controlling operation of the fan. The switch can be omitted in burner systems calling for continuous fan operation. In either the manual or thermostatic operation, movement of the manual or thermostatic control to a position calling for a flow rate above a predetermined rate is ineffective to increase the rate in absence of fan operation. If the unit is one in which the fan operates continuously, movement of the manual or thermostatic control to increase the rate above the predetermined rate will so increase the rate unless the fan has failed. In units providing "on-off" operation of the fan, movement of the manual or thermostatic control to increase the flow rate will close the fan circuit, but will be ineffective to increase the flow rate until the fan outlet pressure sensitive diaphragm in the present control responds to fan operation and allows the outlet valve to go to the selected level.

Figure 15:
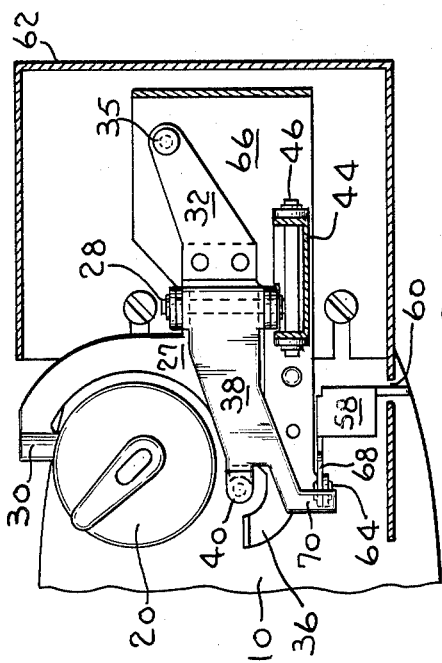
Fig. 15 is a section taken as indicated by line 15—15 on Fig. 2.
Figure 16:
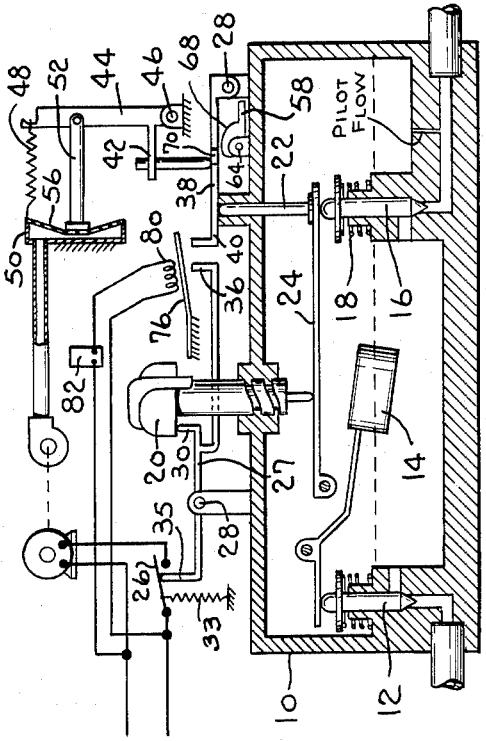
Fig. 16 is a schematic showing of the assembly illustrated in Fig. 1; that is, a constant level valve provided with the present control and with an electric valve operator adapted for control by a room thermostat.
Figure 13:
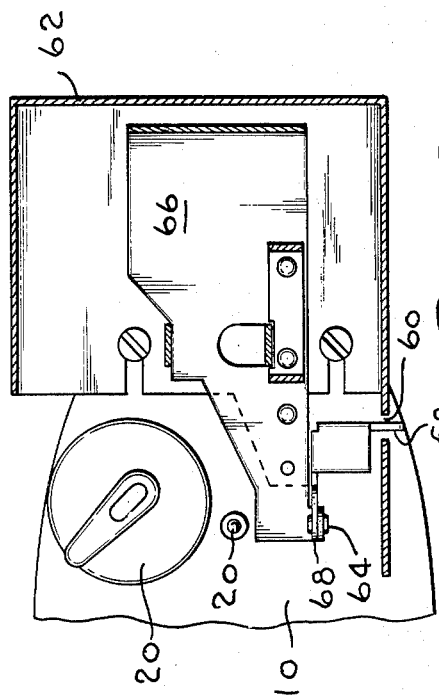
Fig. 13 is a section taken as indicated by line 13—13 on Fig. 2.
Figure 14:
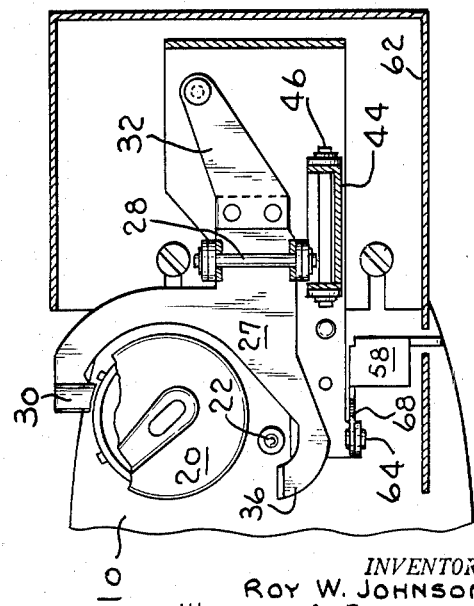
Fig. 14 is a section taken as indicated by line 14—14 on Fig. 2.

Figs. 1, 2 and 16 in the drawings show the present control used in connection with a constant level valve provided with a so-called electric top controlled by a room thermostat. The other figures in the drawings do not show the electric top in order to simplify understanding of the mechanism. It should be understood that the electric top can be used or omitted, if desired. Similarly, all the drawings show a fan switch which can be omitted if it is desired to use the control in connection with a continuously operated fan.

Referring to the drawings now in detail, the constant level valve may be of the type shown in Patent No. 2,317,063 in which housing 10 contains inlet valve 12 controlled by float 14 to maintain a constant level within the casing. Flow from the casing is regulated by outlet valve 16 biased by spring 18 to its open position. Pilot flow can be through a separate orifice or can be a minimum setting of the main outlet valve. A leverage regulates the amount of opening of outlet valve or metering pin 16 in accordance with the setting of manual knob 20 or actuating pin 22 which projects through the top of the housing. The knob employs a cam and cam follower to impart the desired movement to the leverage. Details of such a cam arrangement form no part of the present invention and are, therefore, omitted except for the schematic representation in Fig. 16. However, further details of one such construction can be found in Patent No. 2,244,161. For understanding the present invention, it is necessary only to appreciate that the maximum open position of metering stem 16 is determined by either the knob or the actuating pin 22. If the knob or the actuating pin is held at the pilot position, the metering stem will be at the pilot position even though the other is set for a higher flow rate. This is apparent on inspection of the diagrammatic showing in Fig. 16 wherein the knob and pin act on lever 24.

Due to the nature of the construction of the knob, the knob itself rises with respect to the top of the housing as the knob is rotated from pilot position to the maximum fire position. Therefore, this movement of the knob can be used as an indicia of the setting of the knob. Other means of obtaining similar movement in other knob structures will readily be suggested. In the illustrated embodiment the vertical movement of the knob is used to actuate the fan switch 26. Thus, switch actuating lever 27 is fulcrumed on pin 28 and includes arm 30 which underlies the edge of knob 20 and is biased by the built-in spring biasing the switch 26 closed (such as spring 33 in schematic Fig. 16) to follow the movement of the knob. Therefore, as the knob is rotated from the pilot (low) position to the high fire (elevated) position, the arm 30 follows the vertical movement of the knob so the resilient switch actuating arm 32 will drop until switch actuating plunger 34 drops to close the switch to complete the combustion air fan circuit. The switch actuating arm 32 is resilient in order to prevent injury to the switch 26 when the knob is turned down to the pilot position. Switch lever 27 also includes arm 36 which projects around the valve actuating pin 22 and terminates adjacent the pin 22. The switch operating lever 27 can be omitted along with switch 26 if the combustion fan is to be continuously operated.

Arm 38 is also pivotally mounted on pin 28 and is provided with a depending finger 40 which overlies and acts directly on actuating pin 22. Therefore, the position of this arm 38 can determine the position of the metering valve 16. Adjustable calibrating screw 42 carried in plate 44 pivotally mounted on pin 46 acts on arm 38 while the plate 44 is biased counter-clockwise (Figs. 3 and 4) by tensioned spring 48 connected to bracket 44 and to diaphragm housing 50. Bracket 44 is also connected by rod 52 to the diaphragm pad 54 at the center of diaphragm 56. The right-hand side (Fig. 3) of diaphragm 56 is in communication with atmospheric pressure while the left-hand side of the diaphragm is subjected to the pressure on the delivery side of the fan. Accordingly, when the fan is in operation, the pressure on the left-hand side of the diaphragm will be sufficient to move bracket 44 to the right to raise screw 42 off the operating arm 38 to allow spring 18 to open the outlet valve 16 to the maximum position determined by the setting of the knob 20. It will be evident that should the fan fail for any reason, the pressure on the left-hand side of diaphragm 56 will decrease and allow spring 48 to move bracket 44 to the left (Fig. 3) to act on arm 38 and close the outlet valve.

In the event of a power failure, the circulating fan would not operate and the outlet valve would be held at pilot flow. Most burners are able to handle a flow somewhat greater than pilot flow safely and without unsatisfactory smoky conditions. With this in mind, the present control is provided with a manual lever 58 which projects through the arcuate slot 60 in the side of the control housing 62 and is pivoted at 64 on the base plate 66. The lever includes a cam 68 which acts on the underside of the extending finger 70 of arm 38. Thus, raising lever 58 to the position shown in Fig. 12 will cause cam 68 to act on the underside of finger 70 to raise arm 38 slightly off the actuating pin 22 to allow the outlet valve 16 to open to the maximum safe flow position without forced air circulation. This may be calibrated by screw 72 which acts against plate 74 fixed on the underside of base 66 to bend the portion of base 66 carrying the lever pivot 64 upwardly. When current is restored, the fan will operate and move the bellows which raises arm 38 from cam 68 which allows the lever 58, eccentrically pivoted and, therefore, biased to its inoperative position, to fall to its inoperative position. Thus, restoration of fan operation automatically renders the manual lever 58 inoperative.

As thus far described, the control is used with a manually operated constant level valve either with a continuously operated fan or with an intermittently operated fan. Thus, the setting of knob 20 determines the flow rate to the burner. In the case of the control provided with the fan switch 26, the switch operating arm 30 follows the knob as it rises to increase the flow rate to close the switch when a preselected flow rate is reached. The screw 35 on the end of the switch lever can be adjusted to properly calibrate the switch operation. Assuming that the fan operates, diaphragm 56 will move to the right and lift screw 42 carried by bracket 44 off lever 38 to allow the actuating pin 22 to rise as the outlet valve 16 opens under the bias of spring 18. If the fan should fail for any reason, the pressure on the left-hand side of diaphragm 56 decreases and spring 48 moves bracket 44 back to the left to close down the outlet valve to the pilot flow setting.

Figs. 3, 5 and 9 show the position of the levers when the knob is in the pilot position. It will be noted that when outlet valve 16 is closed, diaphragm 56 is at the left to hold the actuating pin down and, while it doesn't appear in these figures, the knob mechanism acts on lever 24 (see Fig. 16) to also hold the outlet valve 16 closed. In Fig. 5 it will be noted that with the knob in the pilot position, the fan switch 26 is open. When the knob is turned to the high fire position, the switch actuating lever is permitted to move downwardly under the fan switch to allow the switch to close as in Figs. 6 and 10. These figures show the outlet valve closed with the bellows unaffected by the fan pressure. Thus, the figures may be considered to be taken at the instant of switch closure or during a period when the fan is not operating due to failure of power or of the fan itself. The purpose in taking the figures at this moment is to show the manner in which the diaphragm assembly will act to hold the outlet valve closed to thereby override the manual control imparted by the knob 20. When the fan pressure acts on the diaphragm 56, the bellows will move to the right to rock bracket 44 on its pivot 46 to raise screw 42 and allow arm 38 to rise, thereby permitting valve 16 to open as shown in Fig. 11.

As the knob is turned to decrease the flow rate, a point will be reached at which the fan switch is open and the decrease in pressure to the left of diaphragm 56 will cause the bracket 44 to move under the influence of spring 48 to close the outlet valve. The degree of closure of the outlet valve can be determined by adjustment of screw 42. In other words, if the knob is turned down to a flow rate not requiring forced air draft in the burner, the diaphragm assembly can be calibrated so as to decrease the flow rate to a rate above pilot flow, but less than the rate requiring a supply of combustion air. This rate, of course, could not be greater than that determined by the setting of knob 20. In the drawings, screw 42 is shown adjusted to close the outlet valve when the fan is not operating.

Fig. 12 shows the manner in which the manual lever 58 may be raised to cause cam 68 to lift finger 70 of lever 38 to allow partial opening of the outlet valve during periods of power failure. Reference to this figure will also indicate the manner in which manual lever 58 is unbalanced when in its operative position. Only the friction between cam 68 and finger 70 holds the lever in its operative position. Therefore, as soon as fan operation is resumed, the diaphragm will raise lever 38 (and finger 70) to a higher position which releases lever 58 to fall to its inoperative position.

Figs. 1, 2 and 16 show the manner in which the constant level valve may be provided with a so-called electric top. This electric top is a bimetal 76 mounted on a fixed support 78 and having a heater 80 secured thereto. The current flow through heater 80 is regulated by room thermostat 82. The extreme end of bimetal 76 overlies arm 36 of the switch operating lever 27 and also overlies (though it need not) finger 40 on the arm 38. Thus, as illustrated in the drawings, the bimetal will act on the switch operating lever and will act on actuating pin 22 through finger 40. The cold position of bimetal 76 is "down" which results in opening fan switch 26 and closing outlet valve 16. When the bimetal heater 80 is energized, the bimetal warps upwardly to allow the switch operating lever to rock and close the fan switch. Simultaneously, the tongue of bimetal 76 lifts off finger 40 to allow operation of lever 38 when the diaphragm 56 moves under influence of the fan outlet pressure. Therefore, closure of the room thermostat results in closing the fan switch and when the fan delivers sufficient air, the diaphragm assembly relieves the force on lever 38 to allow valve 16 to open to the flow rate determined by the setting of knob 20. When the room thermostat has been satisfied, heater 80 is de-energized and bimetal 76 cools and warps downwardly. When moving downwardly, the bimetal acts on finger 40 and pin 22 to close down the outlet valve while also acting on arm 36 of the switch operating lever 27 to open the fan switch. As soon as the fan switch is opened bracket 44 is moved by spring 48 and the outlet valve is closed.

As noted above, the operating tongue of bimetal 76 need not overlie the actuating pin 22 and finger 40. This would only result in the flow remaining at full when the room thermostat was satisfied until the bimetal opened the fan switch, at which time the diaphragm assembly would act on the outlet valve to close the outlet valve. It is considered preferable, however, to throttle the flow to the burner prior to interruption of the supply of combustion air.

The manual override lever 58 will operate in connection with the fully automatic operation of the unit just described in the same manner as it operates with respect to the manually operated unit previously described, the only difference being that moving the lever 58 will now additionally lift bimetal 76 which is, of course, necessary in order to get the desired flow rate. If bimetal 76 does not overlie finger 40 above the actuating pin 22, the fan would not go into operation immediately upon resumption of power supply to the control, but would be dependent upon energization of the bimetal heater to first lift the bimetal off finger 36 on the fan switch operating lever.

Although but one embodiment of the present invention has been illustrated and described, it will be apparent to those skilled in the art what various changes and modifications may be made therein without departing from the spirit of the invention or from the scope of the appended claims.

We claim:

1. An air and fuel supply controlling system comprising, a fan for supplying combustion air to a burner, a valve housing, a valve in said housing adapted to control flow of fuel from the housing to a burner, manually operable means operatively connected to said valve for regulating the valve to provide various flow rates, a switch wired in circuit with the fan, means operatively connecting the manual means and the switch to close the switch at all flow rates above a predetermined flow rate and to open the switch when the manual means is actuated to decrease the flow rate below the predetermined rate, means operatively connected to the valve and operable to hold the valve closed independently of the manual means in one position and movable to another position in which it does not affect the valve, means biasing said holding means to said one position, and means connected to said holding means and operable in opposition to said biasing means to move the holding means to said another position in response to air pressure on the delivery side of the fan.

2. A system according to claim 1 including an electrically energizable operator mounted on the housing and adapted to be connected in circuit with a room thermostat to be energized when the thermostat closes the circuit, the operator being operatively connected to the switch to open the switch when de-energized and to close the switch when energized.

3. An air and fuel supply controlling system comprising, a fan for supplying combustion air to a burner, a valve housing, a valve in said housing adapted to control flow of fuel from the housing to a burner, manually operable means operatively connected to said valve for regulating the valve to provide various flow rates, a switch wired in circuit with the fan, means operatively connecting the manual means and the switch to close the switch at all flow rates above a predetermined flow rate and to open the switch when the manual means is actuated to decrease the flow rate below the predetermined rate, means operatively connected to the valve and operable to hold the valve closed independently of the manual means in one position and movable to another position in which it does not affect the valve, means biasing said holding means to said one position, means connected to said holding means and operable in opposition to said biasing means to move the holding means to said another position in response to air pressure on the delivery side of the fan, an electrically energizable operator mounted on the housing and adapted to be connected in circuit with a room thermostat to be energized when the thermostat closes the circuit, the operator being operatively connected to the switch to open the switch when de-energized and to close the switch when energized, second manually operable means having an operative position in which it acts on said holding means in opposition to said biasing means to move the holding means to a position allowing increased fuel flow without air pressure acting on the pressure responsive means, means biasing said second manual means towards an inoperative position in which it does not act on said holding means, and means operable upon movement of the pressure responsive means in the valve opening direction to release the second manual means for movement to said inoperative position.

4. A system according to claim 3 in which the second manual means comprises cam means operable on the holding means and frictionally engaged with the holding means when in said operative position, disengagement of the holding means and the cam means upon operation of the pressure responsive means permitting the means biasing the cam means to return the cam means to its inoperative position.

5. A system according to claim 3 including an actuating pin operatively connected to said valve, and in which the holding means comprises lever means mounted on the housing and acting on said pin.

6. A system according to claim 3 in which the first named manual means comprises a manually operable knob mounted in said housing and accessible from the exterior of the housing.

7. A system according to claim 6 in which the operator is operatively connected to the means connecting the knob and the switch.

References Cited in the file of this patent

UNITED STATES PATENTS

| 1,459,149 | French | June 19, 1923 |
| 1,528,074 | Ralston | Mar. 3, 1925 |
| 2,251,055 | Howard et al. | July 29, 1941 |
| 2,343,188 | Johnson et al. | Feb. 29, 1944 |
| 2,351,973 | Johnson et al. | June 20, 1944 |